(12) United States Patent
Hanna et al.

(10) Patent No.: US 10,221,310 B2
(45) Date of Patent: Mar. 5, 2019

(54) COMPOSITION AND PROCESS OF MANUFACTURE FOR A SHOE SOLE COMPONENT FOR FOOTWEAR

(71) Applicant: LJO, Inc., Fairfield, NJ (US)

(72) Inventors: David Hanna, Howell, NJ (US); Brian Kimberlin, Kinnelon, NJ (US); Antonio DiGangi, Roseland, NJ (US); Chung-Ching Weng, Taipei (TW); Chuin-Hsing Chien, Taipei (TW)

(73) Assignee: LJO, Inc., Fairfield, NJ (US)

( * ) Notice: Subject to any disclaimer, the term of this patent is extended or adjusted under 35 U.S.C. 154(b) by 559 days.

(21) Appl. No.: 14/930,915

(22) Filed: Nov. 3, 2015

(65) Prior Publication Data

US 2016/0160037 A1    Jun. 9, 2016

Related U.S. Application Data

(60) Provisional application No. 62/088,182, filed on Dec. 5, 2014.

(51) Int. Cl.
*C08L 53/00*  (2006.01)
*A43B 13/04*  (2006.01)

(52) U.S. Cl.
CPC .............. *C08L 53/00* (2013.01); *A43B 13/04* (2013.01); *C08L 2205/03* (2013.01)

(58) Field of Classification Search
USPC ......................................................... 525/88
See application file for complete search history.

(56) References Cited

U.S. PATENT DOCUMENTS

| | | | |
|---|---|---|---|
| 5,177,824 A * | 1/1993 | Ou ....................... | B29D 35/122 12/146 B |
| 5,308,420 A | 5/1994 | Yang | |
| 5,560,877 A | 10/1996 | Yung et al. | |
| 6,201,032 B1 | 3/2001 | Shyu | |
| 2005/0258560 A1 | 11/2005 | Chen | |
| 2009/0172970 A1* | 7/2009 | Prieto .................. | A43B 13/187 36/71 |
| 2011/0252670 A1 | 10/2011 | Smith | |
| 2013/0074366 A1 | 3/2013 | Yeh | |
| 2016/0050978 A1* | 2/2016 | Ozturk ................. | A41B 11/007 36/103 |

* cited by examiner

*Primary Examiner* — Terressa Boykin

(74) *Attorney, Agent, or Firm* — The McHattie Law Firm; William Smith

(57) ABSTRACT

This disclosure provides for a new composition of matter, said composition of matter featuring a previously unattainable combination of softness, resiliency, durability and support in a sole material for footwear, as well as a process of manufacturing said composition of matter.

10 Claims, 2 Drawing Sheets

| Generic Component | Compound | Preferred Source | Manufacturer | wt % (rel) |
| --- | --- | --- | --- | --- |
| Polyolefin Elastomer | Olefin Block Copolymers | INFUSE™ 9500 | Dow Chemical | 26.89% |
| EVA | 40% EVA | ATEVA® 4030EVA | Celanese Corporation | 13.45% |
| EVA | 26% EVA | Taisox 7470EVA | Formosa Plastics Corp. | 13.45% |
| EPDM Rubber | EPDM | NORDEL™ EPDM | Dow Chemical | 13.45% |
| Polyolefin Elastomer | Polyolefin Elastomer | LUCENE ™ POE LC670 | LG Chemical | 13.45% |
| Filler Agent | Talcum | LH669 Talcum | Haicheng Super Talc Power Co. Ltd. | 8.07% |
| Filler Agent | Silicon Rubber | EA-5 Abrasion Resistant Agent | Hosung Tech | 2.02% |
| Filler Agent | Poly(styrene-co-butadiene) | FL-150 SBR | Various Manufactures | 1.34% |
| Filler Agent | Saturated Fatty Acid | SA 1801Stearic Acid | PT Sumi Asih Industry | 0.40% |
| Bridging Agent | Zinc Stearate | Zinc Stearate | Various Manufactures | 0.67% |
| Filler | Zinc Oxide | 99.5% Zinc Oxide | Various Manufactures | 1.61% |
| Bridging Agent | Titanium Dioxide | Anatase LO-CR-K | Sachtleben Corp. | 2.02% |
| Filler Agent | Masterbatch | A376 Color Masterbatch | Various Manufactures | 0.02% |
| Filler Agent | Masterbatch | E505 Color Masterbatch | Various Manufactures | 0.22% |
| Bridging Agent | Dicumyl Peroxide | Dicumyl Peroxide | Sinopec Shanghai Gaoqiao Company | 0.94% |
| Bridging Agent | Blowing/ Foaming Agent | DN-10 Azobisformamide | Sopo USA Inc. | 2.02% |

FIG. 1

COMPOSITION AND PROCESS OF MANUFACTURE FOR A SHOE SOLE COMPONENT FOR FOOTWEAR

This application is a divisional of U.S. patent application Ser. No. 14/930,915, filed on Nov. 3, 2015 which in turn claims priority to Provisional U.S. Patent Application Ser. No. 62/088,182, filed on Dec. 5, 2014.

FIELD OF THE INVENTION

This disclosure provides for a new composition of matter, said composition of matter featuring a previously unattainable combination of softness, resiliency, durability and support in a sole material for footwear, as well as a process of manufacturing said composition of matter.

BACKGROUND

A shoe generally consists of two basic parts, an upper and a sole. The upper, which is attached to the sole, is generally designed to encase the top and sides of the foot, with the sole encasing and cushioning the bottom of the foot. Both the upper and the sole secure the shoe to the foot and provide support and protection. The sole provides additional protection, stability and cushioning to the foot, as well as aiding in the overall durability of the shoe.

The soles of modern footwear are often comprised of three separate components; the insole, midsole, and outsole, each lending desirable properties to the overall sole. In some instances, most notably where a reduction in weight is desirable, separate sole components can be combined or omitted.

Modern soles often comprised ethylene vinyl acetate copolymer ("EVA") or dual-density EVA. EVA is lightweight foam based cushioning. Dual-Density EVA is firmer and heavier (twice the mass in the same amount of space) but still a foam-based cushioning.

The insole component is often comprised of a thin layer of EVA, and is the portion of the sole in direct contact with the foot.

The outsole component is that portion of the sole which directly impacts the walking or running surface and generally must be highly durable. The outsole is often comprised of carbon rubber (which is hard), or blown rubber (which is softer). In some instances, the outsole component can be comprised of EVA. In addition, a combination of various materials can be used to produce outsoles with different textures and properties.

It is desirable to have an outsole that is comfortable, responsive and durable with the right mix of bounce and cushion. The foot undergoes significant stress when walking, running, jumping, stopping and starting. The outsole is a very significant and important component in any shoe. There have been many attempts over the years to improve the qualities of an outsole.

The midsole component is often designed to achieve a balance between performance, comfort, looks and durability. The midsole acts as the "shock absorber" between the outsole and the insole. Modern midsoles are typically fashioned from EVA or polyurethane.

In some instances, normally when lightweight is desirable, the outsole and the midsole are combined into a single combined sole component. In this configuration the midsole and outsole are comprised of the same material. This type of combined sole is often constructed from EVA or other materials that exhibit desirable properties. A combined sole provides for a significantly lighter sole (and thus a lighter weight shoe) and also reduces manufacturing complexity.

However, until now, there have been drawbacks to combined soles. Current combined soles are lacking in durability and longevity as compared to soles comprised of a separate midsoles and an outsoles made of rubber. The lack of durability and longevity found in currently available combined soles is more pronounced when the combined sole is made from softer compounds or materials, such as softer EVA. Thus, while softer compounds or materials provide for better shock absorption, comfort and cushioning to the foot, the use of softer compound or materials reduces the durability and longevity of currently available combined soles.

Additionally, current shoes that are comprised of a combined sole, regardless of softness, are less durable than shoes comprised of separate midsoles and rubber outsoles.

Due to this fact, there is no material currently available for use in a sole or combined sole that is capable of providing both superior durability and softness.

To overcome this unmet need, current soles often incorporate gel and/or air compartments to create desired shock absorption, comfort and/or cushioning properties, while at the same time creating the desired level of softness. However, the use of gel and/or air pockets increase cost, complexity and weight of existing soles.

There have been many attempts at producing lighter, stronger, and more stable sole materials that also provide for more cushioning while maintaining or increasing durability. Footwear soles and processes for their manufacturing are known in the art.

For example, U.S. Pat. No. 5,560,877 titled, "PROCESS FOR MANUFACTURING AN ETHYLENE VINYL ACETATE SOLE USING FIRST AND SECOND MOLD UNITS" issued Oct. 6, 1996 discloses, "a process for manufacturing an ethylene vinyl acetate (EVA) sole that involves weighing molding compounds for manufacturing the sole. The molding compounds include, by weight, 65-75% of ethylene vinyl acetate pellets, 3-5% of blowing agents, 20-30% of fillers, and 1-2% of crosslinking agents. The molded compounds are mixed, and extruded by means of a twin screw extruder so as to form a web of unfoamed extruded output. The web is cut into sheets. At least one of the sheets is placed into a first mold unit, which is heated and pressurized so as to form a rough foamed sole. The rough foamed sole is placed into a second mold unit, which is heated, pressurized, and cooled so as to form an embossed sole with a predetermined pattern. The embossed sole is trimmed so as to form a finished ethylene vinyl acetate sole."

In another example, U.S. Pat. No. 5,177,824 titled "METHOD OF MAKING EVA MIDSOLE" issued Jan. 12, 1993 discloses "a method of making shoe midsole includes a compound containing in percentage by weight the substances such as 100% of ethylene vinyl acetate (EVA) into which 5-40% of filling agent, 1-10% of foaming agent, 0.5-3% of bridging agent, 0.5-5% of finishing aid, 0.1-1% of foaming aid and coloring agent are added. Such compound is made into particles to be injected into the primary mold in which the preliminary blank of midsole is formed. The preliminary blank is made to foam to take shape of a molded blank under heat and pressure so as to ensure that the size of the molded blank corresponds to that of the midsole intended to be made. The molded blank is then treated in the secondary mold under heat and pressure and is subsequently cooled to take form of the midsole intended to be manufactured."

In another example, U.S. Pat. No. 5,308,420 titled "EVA INSOLE MANUFACTURING PROCESS" issued Oct. 1, 1996 discloses "an EVA insole manufacturing process includes a step of making a molding by injecting molding an EVA resin and foaming agent mixture without through crushing or cutting procedure, and a step of heating the molding thus obtained in a mold so that it forms into a predetermined shape. Two or more moldings which respectively contain a different concentration of foaming agent or a different pigment color may be molded together so as to produce an insole which has different hardness and color at different parts thereof."

In another example, U.S. Pat. No. 6,201,032 B1 titled "EVA-BASED FOAMABLE COMPOSITION AND PROCESS FOR MAKING BIODEGRADABLE EVA FOAM" discloses an "EVA-based foamable composition containing an EVA resin, a foaming agent, a cross-linking agent, a lubricant, a filler, and a plant material selected from a group consisting of a starchy material, powdered grain husks, and wood shavings."

In another example, U.S. Pub. No. US 2013/0074366 A1 titled "COMPOUND STRUCTURE OF MID-SOLE AND INSOLE" discloses "a compound structure of mid-sole and insole. A PU outer sole is made into a trough shape in order to reduce the use of PU and thus the weight thereof. The mid-sole and insole are made as a compound of a lightweight material, such as EVA, and disposed inside the trough. The invention thus provides best comfort to the user while the total weight of shoe is effectively reduced."

In another example, U.S. Pub. No. US 2005/0258560 A1 titled "METHOD FOR PRODUCING AN EVA SOLE MATERIAL" discloses a "a method for producing an EVA sole material compris[ing] the steps of uniformly mixing EVA (ethylene-vinylacetate) material and foam material sufficiently as a mixture material; using at least one rollers rolling through the mixture material as a sheet; cutting the sheet into a plurality of sub-sheets; overlapping some of the plurality of sub-sheets to have a predetermined weight; placing the overlapping sub-sheets into a sealed space in a mold having a texture of a shoe; venting and vacuuming air within the space; foaming the sub-sheets in the mold; vacuuming the sub-sheets in the mold; transferring the sub-sheets through a transfer belt with different temperature stages of 75° C., 65° C., 55° C., 35° C. sequentially through a time period of about 40 minutes; wherein each temperature being retained another predetermined time period in the transfer belt; and checking and packing the produced sub-sheets."

In another example, U.S. Pub. No. US 2011/0252670 A1 titled, "DUAL DENSITY EVA FOOTWEAR MID-SOLE AND METHOD OF MAKING SAME" discloses "The method for fabricating a dual-density mid-sole includes the steps of: injection molding EVA material of a first density into a block; placing the first density EVA block and raw EVA material pellets of a second density together in a mold cavity; and applying heat and pressure to the first density EVA block and raw EVA material pellets of a second density in the mold cavity to form a fused component. The fused component is shaped and detailed into the mid-sole in a separate mold cavity. The result is a dual-density mid-sole consisting of one or more blocks of EVA material of a first density fused to EVA material of a second density where the size, shape and location of the different density sections can be accurately controlled and precisely defined. An article of footwear including an upper, the dual-density mid-sole consisting of one or more blocks of EVA material of a first density fused to EVA material of a second density, and an outsole, may be formed."

There is no currently disclosed combined sole or general sole material for creating a sole component that exhibits a completely satisfactory combination of softness, resiliency, support and high durability.

It is therefore an object of embodiments herein to provide a new composition of matter and process of manufacture of said composition to be used in footwear, which exhibits the properties of low durometer softness, full support and a high resistance to wear and abrasion all in one material. Embodiments herein provide for a material that is durable, light, strong and abrasion resistant for use as a sole component and/or combined sole that also offers superior cushioning for use in shoe soles as compared to any sole material previously known.

None of the foregoing references, alone or in combination, teach the salient and essential features of embodiments disclosed herein. There remains, therefore an unmet need.

SUMMARY OF THE INVENTION

In general, the embodiments herein provide for a proprietary composition of matter to be used in, inter alia, sole materials, and a process for manufacturing the same that yields a highly durable, abrasion resistant, lightweight, soft, cushioning and stabile surface upon which to craft a shoe. One skilled in the art will appreciate that the materials and process disclosed herein can be modified to yield similar results or may be applied in any area of art where such a material as disclosed herein may be desirable.

In one embodiment, this disclosure provides a composition of matter comprised of EVA, ethylene propylene diene terpolymer ("EPDM") rubber, polyolefin elastomer ("PE"), filler agents and bridging agents. Said composition of matter may be produced into a material suitable for use as, inter alia, a sole component via the following process:

(1) Weighing various compounds at predetermined disclosed relative total weights;
(2) Heating the weighed compounds to a predetermined disclosed temperature and mixing the compounds into a liquid paste;
(3) Forming pellets from the liquid paste that solidify upon cooling;
(4) Heating the solid pellets to a predetermined disclosed temperature to liquefy the pellets;
(5) Injecting the liquefied mixture at a predetermined pressure into a injection mold using a known injection molding device;
(6) Waiting a predetermined disclosed time before opening the injection mold;
(7) After the injection mold is opened, removing the formed sole;
(8) Allowing for natural cooling of the formed sole at room temperature for a predetermined disclosed period of time;
(9) Subjecting the formed sole to predetermined disclosed levels of cooling for predetermined disclosed periods of time;
(10) Allowing the formed sole to firm for a predetermined disclosed amount of time.

A better understanding of the composition and process of this disclosure may be had from a consideration of the detailed descriptions of the preferred embodiments, found hereafter, particularly when these descriptions are considered in conjunction with the accompanying figures and tables.

BRIEF DESCRIPTION OF THE DRAWINGS

FIG. 1 depicts one embodiment of the relative total weights of a preferred mixture of ingredients to form the compound of one embodiment disclosed herein.

DETAILED DESCRIPTION

Figure 2:
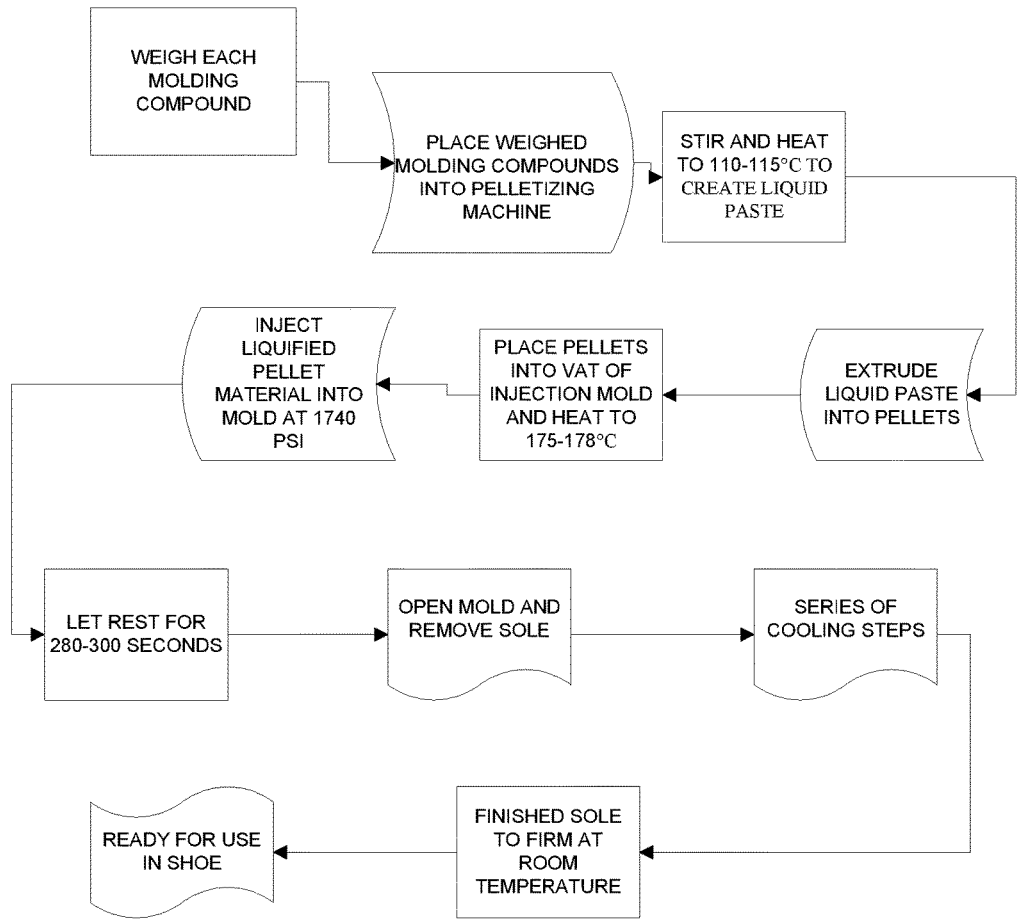
FIG. 2 depicts a flow chart of one embodiment of a process disclosed herein for making the compound of one embodiment disclosed herein by using the ingredients as described herein.

For clarity of disclosure, and not by way of limitation, the detailed description of embodiments presented herein is divided into the following subsections that describe or illustrate certain features, embodiments or applications.

Definitions

"Room Temperature" shall mean a temperature of from about 59 degrees Fahrenheit to approximately 77 degrees Fahrenheit which is suitable for human occupancy and at which laboratory experiments are usually performed.

"Master Batch" shall mean any batch coloring agent known in the art.

"About" shall mean plus or minus 1%.

The Material and Process

Embodiments of the EVA/PE/EPDM composition of matter and process for the production thereof comprise, generally, EVA, EPDM rubber, PE, filler agents and bridging agents. The general proportions by relative total weight of these components in some preferred embodiments are provided in TABLE 1.

TABLE I

| Component | Range (wt %) | Preferred Value (wt %) |
|---|---|---|
| EVA | about 25% to about 28% | about 27% |
| EPDM Rubber | about 12% to about 14% | about 13.5% |
| Polyolefin Elastomer | about 38% to about 42% | about 40.5% |
| Filler Agents | about 12% to about 14% | about 13.5% |
| Bridging Agents | about 5% to about 6% | about 5.5% |

In some preferred embodiments, the general ratio of PE, EVA, EPDM, Filler and Bridging Agents is about 15:10:5:5:2, by weight, respectively.

Examples of suitable EVA are known in the art, including EVA from any source. In one embodiment, preferred EVA comprises a combination of 40% EVA such as ATEVA®4030EVA (Celanese Corporation, Irving, Tex.) and 26% EVA such as Taisox 7404EVA (Formosa Plastics Corp., Taiwan). Examples of suitable EPDM rubber are also known in the art and includes EPDM rubber from any source. Preferred EPDM comprises NORDEL™ EPDM (Dow Chemical, Midland Mich.).

Suitable PE is known in the art and generally comprise copolymers of either ethylene-butene or ethylene-octene. In one embodiment, preferred PE comprises a combination of ethylene 1-octene copolymer (such as LUCENE™ POE LC670, LG Chem., LTD, South Korea) and olefin block copolymers (such as INFUSE™9500 Dow Chemical, Midland Mich.). Additional suitable polyolefin elastomers may also include ENGAGE™ Polyolefin Elastomer (Dow Chemical, Midland Mich.), SABIC™ POE (Saudi Basic Industries Corp., Saudi Arabia), NOTIO™ Polyolefin Elastomer (Mitsui Chemical, Japan and the like.

Suitable filler agents for sole materials are known in the art. In one embodiment, preferred filler agents comprise silicate minerals, such as EVA grade talcum powder, as well as silicon rubber, impact modified copolymers such as poly(styrene-co-butadiene) and saturated fatty acids such as stearic acid. Preferred fillers also include zinc oxide and pigments such as master batch compounds. Preferred fillers are typically low cost and some have a capability of adjusting the overall pH value of the composition for facilitating molding or other qualities.

Suitable bridging agents for sole materials are known in the art. In one embodiment, suitable bridging agents comprise zinc stearate (zinc octadecanoate) and titanium oxide (titanium diozide). In one embodiment, dicumyl peroxide such as DCP (Sinopec Shanghai Gaoqiao Company, Shanghai, China) or DCP Bridging Agent (Beijing Credit New Material Co., Ltd., Beijing, China) are preferred bridging agents. Dicumyl peroxide is a strong free radical source used as a polymerization initiator, catalyst and vulcanizing agent and decomposes rapidly, causing fire and explosion hazard on heating and under influence of light. It reacts violently with incompatible substances. Dicumyl peroxide is known in the art for use in vulcanization of rubber, a crosslinking agent in the synthesis of polylactic acid composite fibers, the preparation of polyethylene composites and the synthesis of polyamide 112/ethylene vinyl acetate copolymer blends.

Suitable blowing/foaming agents (a subset of bridging agents) for use in sole materials are known in the art. In one embodiment, preferred blowing/foaming agents comprise azobisformamide such as DN-10 Azobisformamide (Sopo USA Inc., Irvine, Calif.) or DN-10 Azobisformamide (Intertek, London, United Kingdom), a non-toxic, relatively high decomposition temperature and large gas evolution property blowing/foaming agent that has good dispersion in plastic and rubber.

A preferred embodiment of this disclosure is provided in TABLE II. The compounds set forth in TABLE II and their disclosed weight ratios are all about such percentage and as set forth are hereinafter collectively known as the "Molding Compounds."

TABLE II

| Generic Component | Compound | Preferred Source | Manufacturer | wt % (rel) |
|---|---|---|---|---|
| Polyolefin Elastomer | Olefin Block Copolymers | INFUSE ™ 9500 | Dow Chemical | 26.89% |
| EVA | 40% EVA | ATEVA ® 4030EVA | Celanese Corporation | 13.45% |
| EVA | 26% EVA | Taisox 7470EVA | Formosa Plastics Corp. | 13.45% |
| EPDM Rubber | EPDM | NORDEL ™ EPDM | Dow Chemical | 13.45% |

TABLE II-continued

| Generic Component | Compound | Preferred Source | Manufacturer | wt % (rel) |
|---|---|---|---|---|
| Polyolefin Elastomer | Polyolefin Elastomer | LUCENE ™ POE LC670 | LG Chemical | 13.45% |
| Filler Agent | Talcum | LH669 Talcum | Haicheng Super Talc Power Co. Ltd. | 8.07% |
| Filler Agent | Silicon Rubber | EA-5 Abrasion Resistant Agent | Hosung Tech | 2.02% |
| Filler Agent | Poly(styrene-co-butadiene) | FL-150 SBR | Various Manufactures | 1.34% |
| Filler Agent | Saturated Fatty Acid | SA 1801Stearic Acid | PT Sumi Asih Industry | 0.40% |
| Bridging Agent | Zinc Stearate | Zinc Stearate | Various Manufactures | 0.67% |
| Filler | Zinc Oxide | 99.5% Zinc Oxide | Various Manufactures | 1.61% |
| Bridging Agent | Titanium Dioxide | Anatase LO-CR-K | Sachtleben Corp. | 2.02% |
| Filler Agent | Masterbatch | A376 Color Masterbatch | Various Manufactures | 0.02% |
| Filler Agent | Masterbatch | E505 Color Masterbatch | Various Manufactures | 0.22% |
| Bridging Agent | Dicumyl Peroxide | Dicumyl Peroxide | Sinopec-Shanghai Gaoqiao Company | 0.94% |
| Bridging Agent | Blowing/Foaming Agent | DN-10 Azobisformamide | Sopo USA Inc. | 2.02% |

A preferred embodiment of a process of manufacture for the composition disclosed herein is as follows:

(1) Weigh the Molding Compounds according to the relative total weights set forth in TABLE II.
(2) Place the weighed Molding Compounds into a heating vat of a pelletizing machine, and begin stirring and heating to 110-115° C. to create an evenly mixed liquid paste;
(3) Extrude the liquid paste into a tube shape and as the mixture cools, cut to create solid pellets. The pellets should substantially measure 4.5 mm in diameter and 3 mm in length;
(4) Place the pellets into any known injection molding machine and/or injection press and heat to a vat temperature of 175-178° C. to liquefy the pellets;
(5) Inject the resultant liquefied pellet material into preformed injection molds via the injection molding or injection press machine at a pressure of about 1740 PSI;
(6) Leave the injection mold closed for about 280-300 seconds allowing the injected material to form a sole;
(7) Open the injection mold and remove the formed sole from the mold;
(8) Allow for natural cooling of the formed sole at room temperature for about 60 seconds;
(9) Directly thereafter, subject the formed sole to sequential cooling of about 80° C. for about 300 seconds, about 70° C. for about 300 seconds, about 60° C. for about 300 seconds, about 50° C. for about 300 seconds, and about 40° C. for about 300 seconds;
(10) Allow the formed sole to firm for about 180 to 300 seconds at room temperature.

The resulting sole will have a hardness value of between 40 C and 50 C on the Shore scale and will exhibit relatively high durability and abrasion resistant properties as compared to known materials that possess similar softness and resiliency. Such a combination of properties heretofore was unobtainable in a single sole material.

In another embodiment, the relative total weights of the Molding Compounds listed in TABLE II may varied by as much as about plus or minus 5% in order to achieve a desired hardness, durability and abrasion resistant properties in the resulting material.

In one embodiment, the Molding Compounds listed in TABLE II may be combined at any relative total weights to achieve a desired hardness, durability and abrasion resistant properties in the resulting material.

In yet another embodiment, the composition may be comprised of any suitable compound know in the art that falls into the categories listed in TABLE I. In some embodiments, any suitable compound known in the art that falls into the categories listed in TABLE I can be combined in any relative total weights suitable to achieve a desired hardness, durability and abrasion resistant property combination in the resulting material.

In yet another embodiment, the composition is comprised of any material known in the art to be analogous to any one or more the Molding Compounds listed in TABLE II. In some embodiments, the analogous compounds are weighed in accordance with their respective analog's relative total weights listed in TABLE II.

In one embodiment, the Molding Compounds also include any coloring agent known in the art.

In another embodiment of the process of manufacture for the disclosed compound, the injection mold of step (6) will remain closed for a period of about 252-330 seconds.

In yet another embodiment of the process of manufacture for the disclosed compound, the injection molding (5) is performed at a pressure of between about 1,299 and 2,181 PSI.

In one embodiment of the process of manufacture for the disclosed compound, the injection molding of step (5) is adjusted by as much as about 3% based upon the prevailing barometric pressure and/or altitude. The lower the barometric pressure (or the higher the altitude and thus a lower surrounding pressure), the higher the PSI should be from normal. One skilled in the art, with minimal experimentation, will readily be able to make this adjustment based on this disclosure.

In one embodiment of the process of manufacture for the disclosed compound, once the pellet mixture is liquefied and injected into the mold under appropriate pressure, chemical activation occurs and the mixture increases in volume to about 160% its original size to form its intended size and shape. The sole will have an expansion/shrinkage allowance of plus or minus about 2%. In a preferred embodiment, an injection mold is filled to capacity with the liquefied pellet mixture under disclosed pressures, temperatures and time frames, and then the mold is opened and the resulting formed material increases in volume to about 160% of the size of the mold to form the intended size and shape of end product.

In one embodiment of the process of manufacture for the disclosed compound, the pressure of the injection molding of step (5) is varied between about 1,299 and 2,181 PSI depending on the current ambient atmospheric/barometric pressure.

In another embodiment of the process of manufacture for the disclosed compound, the temperatures associated with the sequential cooling of step (9) may be adjusted by plus or minus about 5%. In yet another embodiment, the cooling times associated with the sequential cooling of step (9) may be adjusted by plus or minus about 5%.

In yet another embodiment of the process of manufacture for the disclosed compound, the temperatures and cooling time associated with the sequential cooling of step (9) may both be adjusted by plus or minus about 5%.

In one embodiment, the resulting sole is paintable and/or capable of accepting transfer prints.

In one embodiment, the resulting sole is capable of fixable attachment to other sole materials such as rubber, thermoplastic elastomers, thermoplastic rubbers and thermoplastic polyurethane, as well as any other outsole material known in the art as well as attachable to any desired shoe upper materials.

With embodiments as disclosed thus explained, it is apparent that numerous modifications and variations can be made without departing from the scope and spirit of the composition disclosed. It is therefore intended that this disclosure be limited only as indicated in the appended claims.

Publications cited throughout this document are hereby incorporated by reference in their entirety. Although the various aspects of the disclosed embodiments have been illustrated above by reference to examples and preferred embodiments, it will be appreciated that the scope is defined not by the foregoing description but by the following claims properly construed under principles of patent law.

Each and every feature described herein, and each and every combination of two or more of such features, is included within the scope disclosed herein provided that the features included in such a combination are not mutually exclusive.

What is claimed is:

1. A composition of matter comprising the following ingredients by relative total weights:
   about 25% to about 28% ethylene vinyl acetates;
   about 12% to about 14% ethylene propylene diene monomer rubber;
   about 38% to about 42% polyolefin elastomers;
   about 12% to about 14% filler agents; and
   about 5% to about 6% bridging agents.

2. The composition of claim 1 wherein the ethylene vinyl acetates comprise about 27% by total relative weight.

3. The composition of claim 1 wherein the polyolefin elastomers comprise ethylene-octaene copolymer and olefin block copolymer.

4. The composition of claim 1 wherein the polyolefin elastomers comprise about 13% ethylene-octaene copolymer and about 27% olefin block copolymers by total relative weight.

5. The composition of claim 1 wherein the filler agents comprise talcum, silicon rubber, poly(styrene-co-butadiene), stearic acid, zinc oxide and master batch compounds.

6. The composition of claim 1 wherein the filler agents comprise by relative total weights about: 8% talcum, 2% silicon rubber, 1.4% poly(styrene-co-butadiene), 0.4% stearic acid, 1.6% zinc oxide and 0.2% master batch compounds.

7. The composition of claim 1 wherein the bridging agents comprise zinc stearate, titanium oxide, dicumyl peroxide and azobisformamide.

8. The composition of claim 1 wherein the bridging agents comprise by relative total weights about: 0.7% zinc stearate, 2% titanium oxide, 0.9% dicumyl peroxide and 2% azobisformamide.

9. The composition of claim 1 wherein, by relative total weights, the ingredients comprise:
   the ethylene vinyl acetates comprise about 26.9%;
   the polyolefin elastomers comprise about 13.45% ethylene-octaene copolymer and about 26.89% olefin block copolymers;
   the ethylene propylene diene monomer rubber comprises about 13.45%;
   the filler agents comprise about: 8.07% talcum, 2.02% silicon rubber, 1.34% poly(styrene-co-butadiene), 0.40% stearic acid, 1.61% zinc oxide and 0.22% master batch compounds;
   the bridging agents comprise about: 0.67% zinc stearate, 2.02% titanium oxide, 0.94% dicumyl peroxide and 2.02% azobisformamide.

10. The composition of claim 9 wherein all percent relative total weights are variable by plus or minus about 5%.

* * * * *